US010255519B2

(12) United States Patent
Nagatomo et al.

(10) Patent No.: US 10,255,519 B2
(45) Date of Patent: Apr. 9, 2019

(54) INSPECTION APPARATUS AND METHOD USING PATTERN MATCHING

(71) Applicant: Hitachi High-Technologies Corporation, Minato-ku, Tokyo (JP)

(72) Inventors: Wataru Nagatomo, Tokyo (JP); Yuichi Abe, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 49 days.

(21) Appl. No.: 15/292,218

(22) Filed: Oct. 13, 2016

(65) Prior Publication Data

US 2017/0109607 A1 Apr. 20, 2017

(30) Foreign Application Priority Data

Oct. 15, 2015 (JP) ................................. 2015-203338

(51) Int. Cl.
*G06K 9/62* (2006.01)
*G06T 7/73* (2017.01)

(52) U.S. Cl.
CPC ......... *G06K 9/6202* (2013.01); *G06K 9/6203* (2013.01); *G06T 7/74* (2017.01);
(Continued)

(58) Field of Classification Search
CPC ...... G06K 9/6202; G06K 9/6203; G06T 7/74; G06T 2207/30148; G06T 2207/10061
See application file for complete search history.

(56) References Cited

U.S. PATENT DOCUMENTS 6,160,903 A * 12/2000 Hamid ............... G07C 9/00158
382/115
7,235,782 B2    6/2007 Takane et al.
(Continued)

FOREIGN PATENT DOCUMENTS

JP    2001-243906 A    9/2001
JP    2002-328015 A    11/2002

*Primary Examiner* — Brenda C Bernardi
(74) *Attorney, Agent, or Firm* — Crowell & Moring LLP

(57) ABSTRACT

To provide means according to which template matching is performed successfully in an apparatus that performs inspection or measurement of a semiconductor pattern, which is formed on a wafer, even in a case in which a pattern for alignment, which is in design data, has been eliminated from an image in which an image of a practical pattern was captured using the apparatus, in which the brightness value contrast of a pattern is lower (more indistinct) than that of other locations, or in which a pattern is deformed and there is a discrepancy with the shape of a template (a pattern for alignment in the design data). An inspection apparatus according to the invention acquires a target retrieval image, and carries out template matching on the target retrieval image, and includes template input, means for inputting a plurality of templates, a plurality of matching candidate selection sections that select a matching candidate group by performing a matching process of the target retrieval image and the plurality of templates, a plurality of single template likelihood calculation process sections that calculate single template likelihoods for a plurality of matching candidate groups that are selected by the plurality of matching candidate selection sections, a multiple template assimilation likelihood calculation process section that calculates a multiple template assimilation likelihood for the matching candidate groups using a plurality of single template likelihoods that are calculated by the plurality of single template likelihood calculation process sections, and a highest assimila- (Continued)

tion likelihood matching candidate selection section that selects a matching candidate for which the multiple template assimilation on likelihood is the highest, from among the matching candidate groups, using the multiple template assimilation likelihoods that are calculated by the multiple template assimilation likelihood calculation process section.

8 Claims, 10 Drawing Sheets

(52) U.S. Cl.
CPC ............. *G06T 2207/10061* (2013.01); *G06T 2207/30148* (2013.01)

(56) References Cited

U.S. PATENT DOCUMENTS

| | | | |
|---|---|---|---|
| 8,160,370 B2* | 4/2012 | Liu | G06T 7/207 348/169 |
| 8,305,435 B2* | 11/2012 | Sato | G06T 7/74 250/311 |
| 8,666,165 B2 | 3/2014 | Yamaguchi et al. | |
| 9,047,673 B2* | 6/2015 | Lee | G06T 7/0081 |
| 9,256,957 B1* | 2/2016 | Frey | G06T 7/2053 |
| 2004/0067659 A1* | 4/2004 | Black | H01L 21/316 438/778 |
| 2006/0104485 A1* | 5/2006 | Miller, Jr. | G06K 9/00885 382/115 |
| 2006/0284837 A1* | 12/2006 | Stenger | G06K 9/00375 345/156 |
| 2012/0170861 A1* | 7/2012 | Shibata | H04N 1/40 382/254 |
| 2012/0207397 A1* | 8/2012 | Nagatomo | G06K 9/6203 382/218 |
| 2013/0314566 A1* | 11/2013 | Walker | G06F 17/30265 348/231.3 |
| 2013/0322737 A1* | 12/2013 | Murakami | G06T 7/001 382/149 |
| 2013/0322772 A1* | 12/2013 | Seo | G06K 9/4671 382/209 |
| 2014/0139425 A1* | 5/2014 | Sakai | G06F 3/011 345/156 |
| 2015/0238271 A1* | 8/2015 | Wollowick | A61B 6/12 600/436 |
| 2016/0055382 A1* | 2/2016 | Horie | G06K 9/00805 382/104 |
| 2016/0140419 A1* | 5/2016 | Sumitomo | G06K 9/6203 382/216 |

* cited by examiner

[Fig. 1]
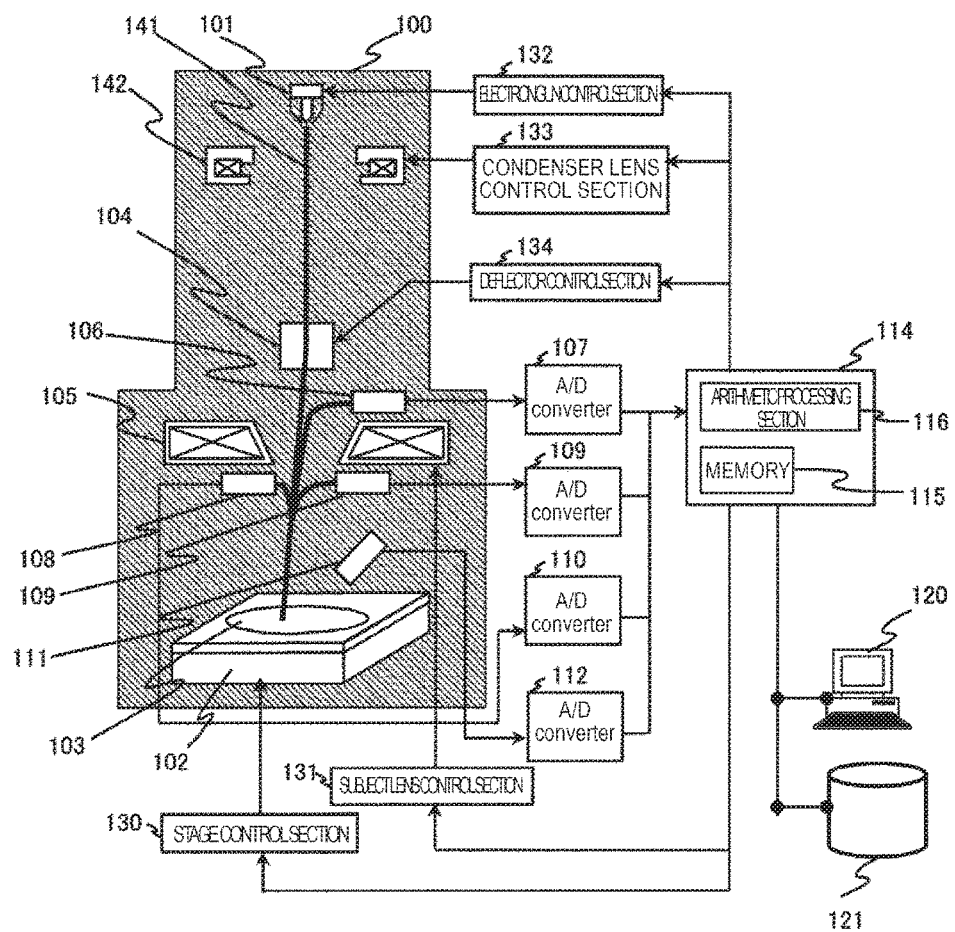

[Fig. 3]
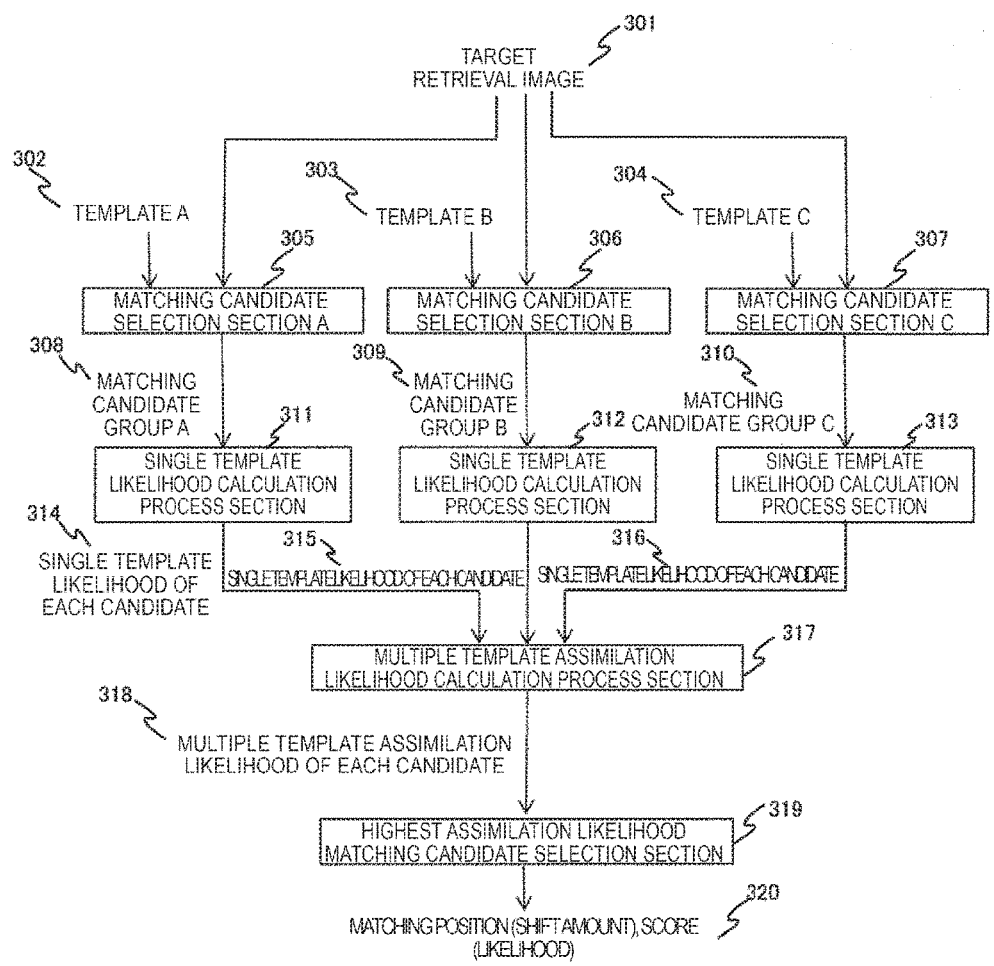

[Fig. 4]
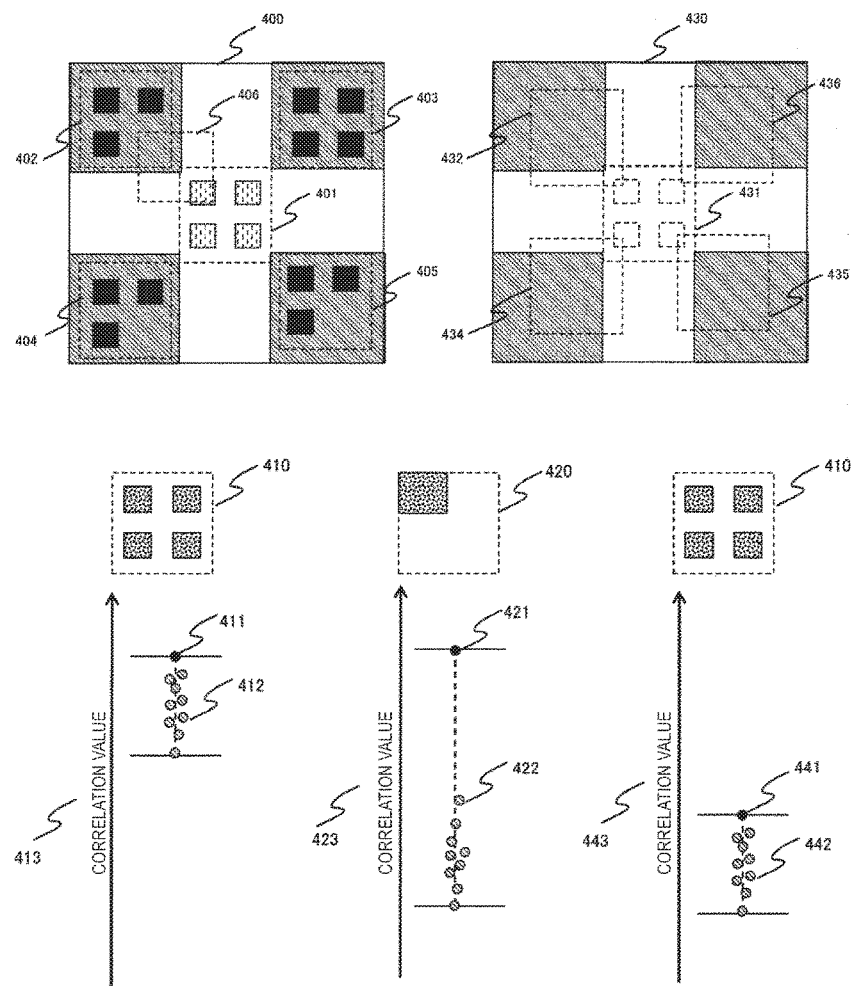

[Fig. 8]
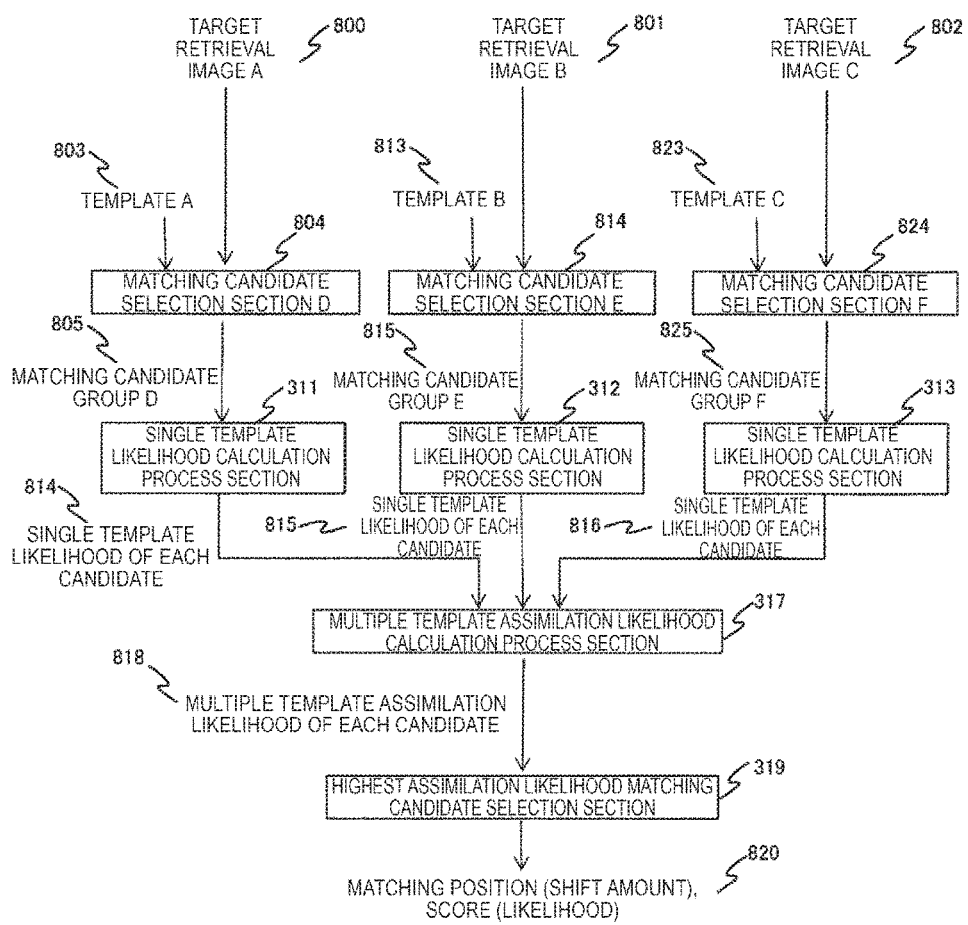

[Fig. 9]
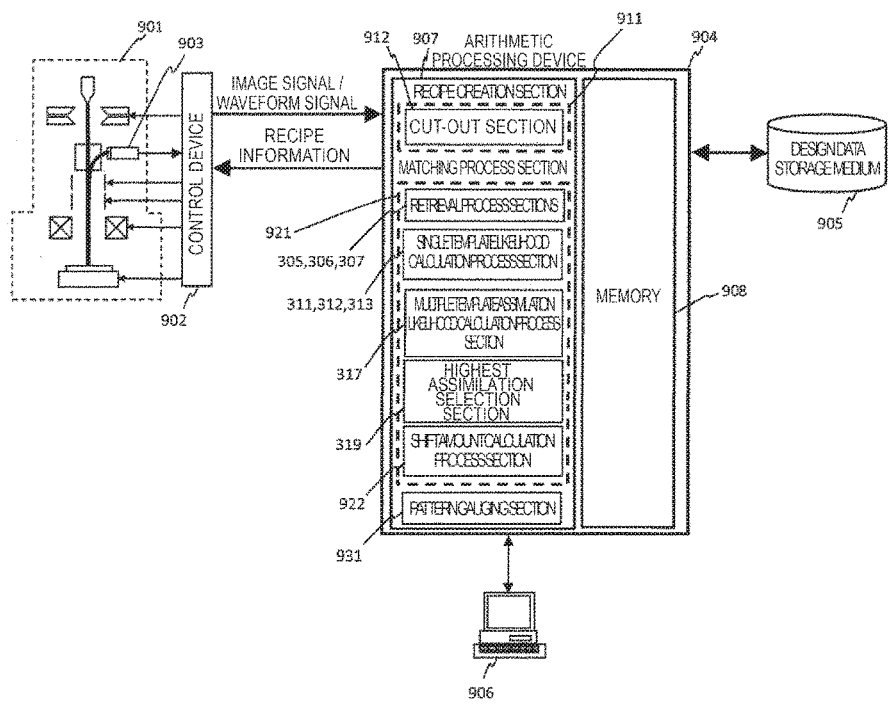

[Fig. 10]
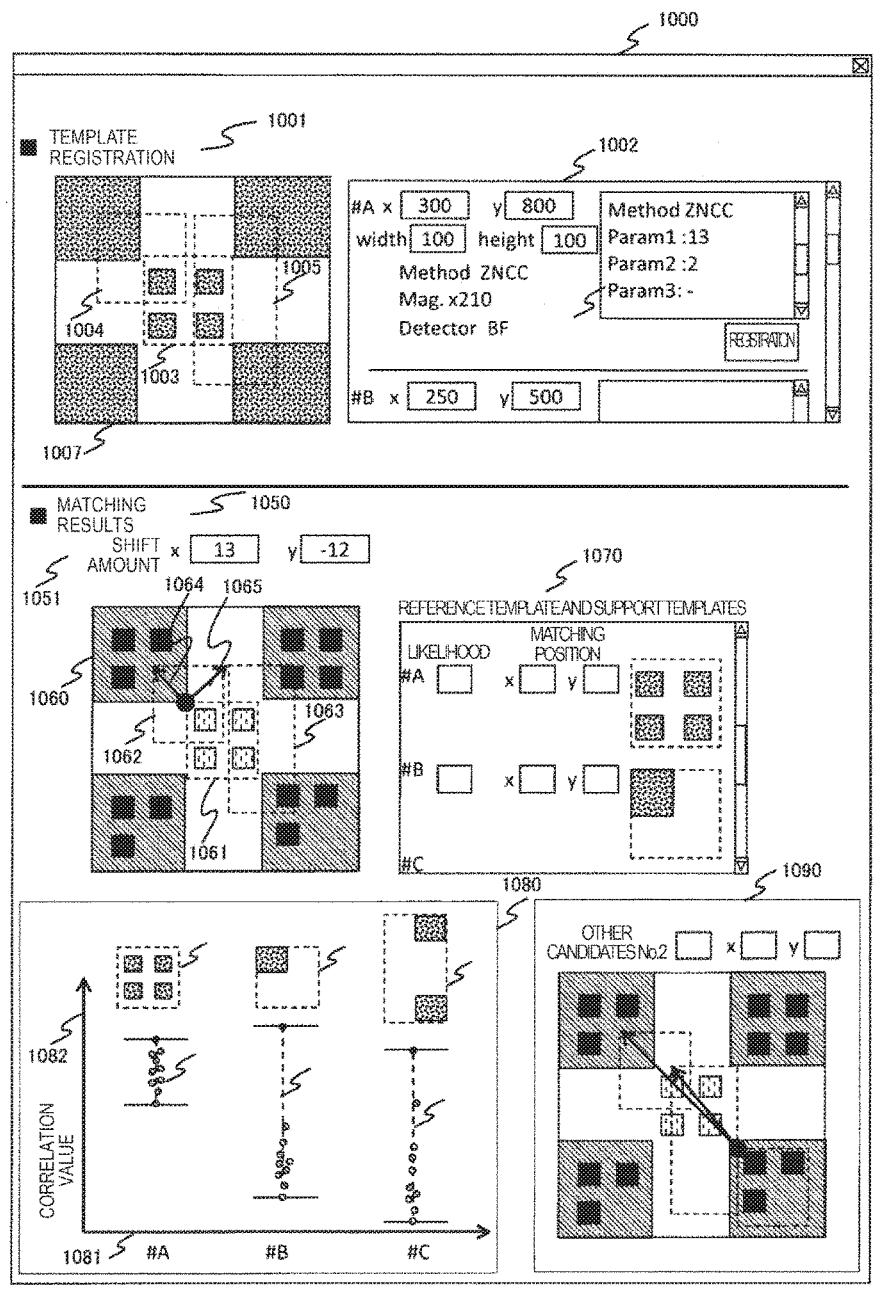

INSPECTION APPARATUS AND METHOD USING PATTERN MATCHING

TECHNICAL FIELD

The present invention relates to a pattern matching technique, and in particular, to an inspection apparatus that uses template matching, which inspects a pattern that is formed on a wafer using an image of a semiconductor device and design data of the semiconductor device.

BACKGROUND ART

In an apparatus that measures and inspects a pattern that is formed on a semiconductor wafer, matching to a field of view of an inspection apparatus in a predetermined measurement position is performed using template matching technology. The template matching is a process that picks out a region, which coincides most with a template image that is registered in advance, from an image of a retrieval subject. For example, in PTL 1, an example of such a template matching method is described.

Measurement of a pattern on a semiconductor wafer using a scanning electron microscope is an example of an inspection apparatus that uses template matching. In the present apparatus, the field of view of the apparatus moves to an approximate position of a measurement position due to stage movement, but in terms of the positioning accuracy of the stage only, there are often cases in which large shifts occur in an image that is captured using a high magnification of the electron microscope. In addition, a wafer is not necessarily placed on the stage in the same direction each time, and a coordinate system (for example, an alignment direction of a chip of the wafer, or the like) of a wafer that is placed on the stage does not completely coincide with a driving direction of the stage, and this can also correspond to a cause of shifting in an image that is captured using a high magnification of the electron microscope. Template matching is performed in order to perform measurement and inspection at an accurate position by correcting such shift. Specifically, after performing alignment with an optical camera having a lower magnification than that of the electron microscope image, alignment is performed in multiple stages by performing alignment using the electron microscope image. Hereinafter, a case of performing alignment of a coordinate system of a wafer, which is placed on the stage, using an optical camera, will be described. In this instance, a case of performing alignment using an image of a plurality of chips, which are in positions that are separated from one another on a wafer (for example, chips on both the left and right ends of the wafer), will be considered. Firstly, an image of a unique identical pattern, which is within or in the vicinity of the respective chips (a pattern, which is relatively in the same position within the respective chips), is captured in a practical sense, and registered as a template. Normally, there are often cases in which a pattern, which is created on a wafer as an alignment pattern for an optical camera, is used as a unique identical pattern that is used in registration as a template. Next, an image is acquired in the respective chips by performing stage movement so that an image of a pattern that is registered as a template in the respective chips is captured. Template matching is performed on the acquired image. A shift amount of stage movement is calculated on the basis of respective matching positions that are obtained as a result, and matching of a coordinate system of stage movement and a coordinate system of the wafer, is performed with the shift amount set as a correction value of stage movement. In the alignment using the electron microscope that is performed subsequently, a unique pattern that is close to the predetermined measurement position is set as a template and registered in advance, and the relative coordinates of the measurement position viewed from the template are stored. Additionally, the relative coordinates in this case are decided by also taking correction amounts determined beforehand by the optical camera into consideration. Further, during determination of a measurement position from an image that is captured by the electron microscope, a matching position is decided by performing template matching in a captured image, and a point at which movement from the matching position of an amount that is equivalent to the relative coordinates stored in advance corresponds to a measurement position. Movement of the field of view of the apparatus up to a predetermined measurement position is performed using this kind of template matching.

In addition, in PTL 2, a method in which a template for template matching is created on the basis of design data of a semiconductor device, is described. If it is possible to create a template on the basis of design data, there is an advantage in that the labor of purposely acquiring an image with the inspection apparatus for template creation is not necessary, and the like. The invention also relates to template matching using this design data.

CITATION LIST

Patent Literature

PTL 1: JP-A-2001-243906
PTL 2: JP-A-2002-328015

SUMMARY OF INVENTION

Technical Problem

In template matching such as that shown in PTL 2, which uses a template created on the basis of design data of a pattern for alignment, if a pattern for which matching is desired, which is within a retrieval image, is similar to a template, a correct matching position is obtained. Hereinafter, an image that is set as a subject of template matching will be referred to as a target retrieval image. For example, when FIG. 2(a) is set as a template 201, and FIG. 2(b) is set as a target retrieval image 210, a region 211 is set as a region for which matching is desired. At this time, among the target retrieval image 210, since the region 211 is most similar to the template 201, it is possible to detect that the region 211 is the matching position comparatively easily in the template matching technique of the related art that is mentioned earlier, and therefore, matching succeeds. However, for example, in a case in which, in the manner of FIG. 2(c), a target retrieval image is an image in which an image of a pattern, which is equivalent to a pattern for alignment, is not captured on a target retrieval image 220, and the pattern is not visible, a case in which the contrast of the image brightness of a pattern, which is equivalent to a pattern for alignment, is lower than that of other locations, or a case in which a pattern, which is equivalent to a pattern for alignment, is deformed and there is a discrepancy with the shape of the template, a concern that the degree of similarity of a region 221 and the template 201 will be low, and therefore, that matching will fail, is high. For example, in the manner of the region 222 within the target retrieval image 220, if there is a region for which the degree of similarity with respect to the template 201 is higher than that of the region 221, there is a concern that incorrect matching with the region 222 will be performed. In addition, examples of a case in which a portion of a pattern, which is equivalent to a pattern for alignment, is not captured and the pattern is not visible, a case in which the contrast of a pattern, which is equivalent to a pattern for alignment, is lower than that of other locations, and a case in which the shape of a pattern, which is equivalent to a pattern for alignment, is deformed and there is a discrepancy with the shape of the template, are shown in the target retrieval image 230 of FIG. 2(d), and in the same manner as FIG. 2(c), there is also a concern that matching will fail in such cases.

One reason for the phenomenon of matching failing in the above-mentioned manner is that in the manufacturing of a semiconductor, devices are often created by stacking layers of a plurality of processes, and therefore, a pattern for alignment may be covered by an upper layer. In a case in which an image is captured by an optical camera, there are often cases in which a pattern for alignment is visible through an upper layer, but for example, in a case in which a pattern, which corresponds to a subject of inspection or measurement, is covered by an antireflective film, or the like, or in a case in which there is a large number of laminations of a target object, even in a case in which an image is captured with an optical camera, there are cases in which matching fails as a result of the reasons mentioned above of a pattern for alignment not being captured clearly and not being visible (being indistinct), the contrast of the image brightness of a pattern for alignment being lower than that of other locations, or the shape of a pattern for alignment being deformed and there being a discrepancy with the shape of the template. Alternatively, there are also cases in which a pattern for alignment is not formed according to design data in the first place as a result of pattern formation in a semiconductor manufacturing process being unstable.

For the above-mentioned reasons, the invention provides means according to which template matching can be performed successfully even in a case in which it is not possible to successfully perform matching of a template, which is created on the basis of design data of a pattern for alignment, and a pattern for alignment within an image of a practical target object (a target retrieval image), which corresponds to a subject of inspection or measurement.

Solution to Problem

An inspection apparatus according to the invention acquires a target retrieval image, and carries out template matching on the target retrieval image, and includes template input means for inputting a plurality of templates, a plurality of matching candidate selection sections that select a matching candidate group by performing a matching process of the target retrieval image and the plurality of templates, a plurality of single template likelihood calculation process sections that calculate single template likelihoods for a plurality of matching candidate groups that are selected by the plurality of matching candidate selection sections, a multiple template assimilation likelihood calculation process section that calculates a multiple template assimilation likelihood for the matching candidate groups using a plurality of single template likelihoods that are calculated by the plurality of single template likelihood calculation process sections, and a highest assimilation likelihood matching candidate selection section that selects a matching candidate for which the multiple template assimilation likelihood is either the highest or is a threshold value or greater, from among the matching candidate groups, using the multiple template assimilation likelihoods that are calculated by the multiple template assimilation likelihood calculation process section.

In addition, the highest assimilation likelihood matching candidate selection section may output either a matching position or a highest assimilation likelihood.

In addition, there may be a plurality of target retrieval images.

In addition, the single template likelihoods, which are calculated by the plurality of single template likelihood calculation process sections, may be calculated using a statistical quantity of a correlation value of a matching candidate within a matching candidate group.

In addition, the invention also provides an inspection method that corresponds to the above-mentioned inspection apparatus.

Advantageous Effects of Invention

According to the invention, in an apparatus that performs inspection or measurement of a semiconductor pattern, which is formed on a wafer, using a template that is created on the basis of design data of a pattern for alignment, it is possible to determine an accurate matching position using template matching even in a case in which a pattern for alignment within an image (a target retrieval image) of a target object is not captured clearly and is not visible (is indistinct), a case in which the contrast of a pattern for alignment is lower than that of other locations, or a case in which a pattern for alignment is deformed and there is a discrepancy with the shape of the template.

BRIEF DESCRIPTION OF DRAWINGS

FIG. 1 is a view that shows an example of a semiconductor inspection apparatus that performs correlation of an SEM image and design data.

FIG. 3 is a block diagram that shows an embodiment of a flow of an arithmetic processing device of template matching of the invention.

FIG. 4 is a detailed explanatory view of single template likelihood.

FIG. 8 is a block diagram that shows another embodiment of a flow of an arithmetic processing device of template matching of the invention.

FIG. 9 is a view that shows a semiconductor gauging system that includes a scanning electron microscope, and a pattern matching apparatus, which executes pattern matching in an image that is obtained by the scanning electron microscope.

FIG. 10 is a view that shows a GUI according to the invention, which displays template registration at a time of performing pattern matching, and matching results.

DESCRIPTION OF EMBODIMENTS

Embodiment 1

Figure 2A:
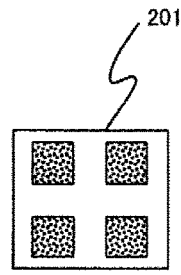
FIGS. 2A-2D are views that show general examples in which matching fails in template matching.
Figure 2B:
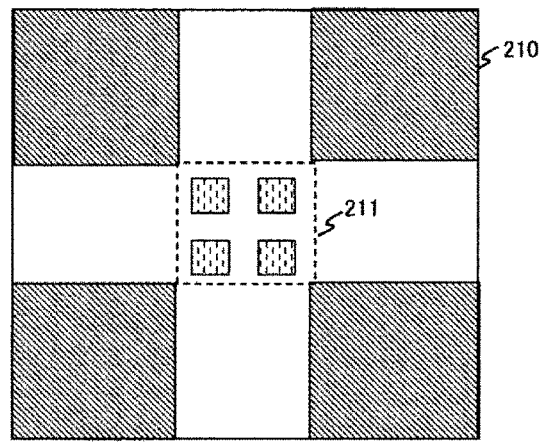
Figure 2C:
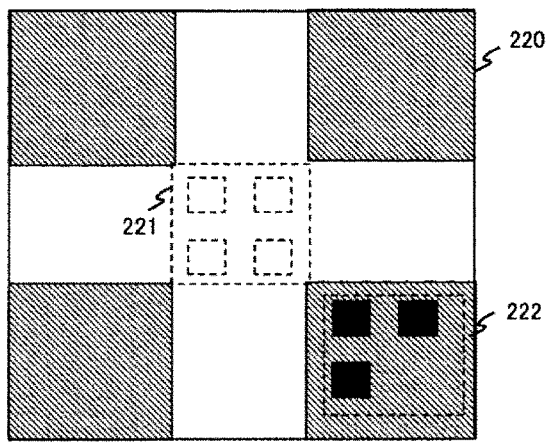
Figure 2D:
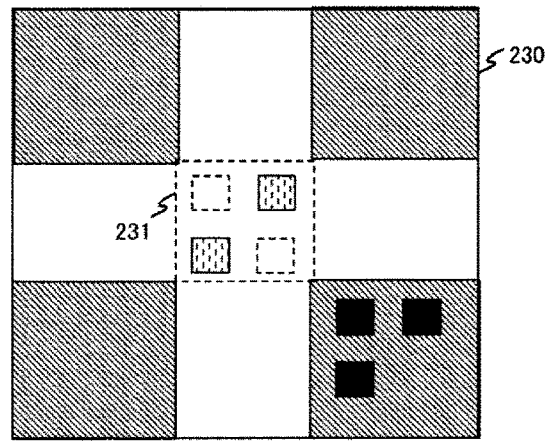

Hereinafter, an inspection apparatus and an inspection method of the invention that use template matching will be described using the drawings. Additionally, in the drawings, unless specifically mentioned, members for which the explanatory number is the same show the same member.

FIG. 1 is a scanning electron microscope (SEM) of the invention that is mainly used in pattern dimension measurement of a semiconductor device, which is formed on a semiconductor wafer, and is an apparatus configuration diagram when performing template matching. A housing 100 is provided with an electron gun 101 in an inner section thereof, and an electron beam 141 is generated from the electron gun 101. After the electron beam 141 is narrowed down by a condensing lens 142, a radiation position and narrowing are controlled by a deflector 104 and an object lens 105 so that the electron beam is radiated linking focal points in arbitrary positions on a semiconductor wafer 103, which is a test piece that is placed on a stage 102. Secondary electrons are emitted from the semiconductor wafer 103, which is radiated by the electron beam, and are detected by a secondary electron detector 106. The detected secondary electrons are converted into a digital signal by an A/D converter 107, the signal is stored in an image memory 115 within an arithmetic processing device 114, and an image process that depends on the object, and an identification process that uses machine learning, are performed by an arithmetic processing section 116. The pattern matching that is described below is performed by the arithmetic processing device 114. The display of input settings of the process and process results is performed by an input-output apparatus 120. In addition, in alignment that uses an optical camera 111, which has a lower power than that of the electron microscope which is mentioned above, after a signal, which is obtained as a result of capturing an image of the semiconductor wafer 103 with the optical camera 111, is converted into a digital signal by an A/D converter 112 (the A/D converter 112 is not necessary in a case in which the signal from the optical camera is a digital signal), the signal is stored in the image memory 115 within the arithmetic processing device 114, and an image process that depends on the object is performed by the arithmetic processing section 116. In addition, in a case in which reflected electron detectors 108 and 109 are provided, reflected electrons, which are emitted from the semiconductor wafer 103, are detected by the reflected electron detectors 108 and 109, and the detected reflected electrons are converted into digital signals by A/D converters 109 and 110. The converted digital signals are stored in the memory 115 within the arithmetic processing device 114, and an image process that depends on the object is performed by the arithmetic processing section 116. In the present embodiment, a scanning electron microscope is shown as an example of an inspection apparatus, but the invention is not limited to this configuration, and can be applied to a measurement apparatus or an inspection apparatus that acquires an image and performs template matching.

FIG. 3 is an embodiment of a template matching process of the invention that correlates an acquired image of a target object, which is captured by an inspection or a measurement apparatus, and a template, which is cut out from an image created using design data as a pattern for alignment, and is a block diagram in which a flow of an arithmetic processing device is shown. In the present embodiment, an example in an SEM that is mainly used in pattern dimension measurement of a semiconductor device, which is formed on a semiconductor wafer, is shown as an example of an inspection or measurement apparatus (the apparatus configuration is shown in FIG. 1). An acquired image in an optical camera for performing alignment of a coordinate system of a wafer that is placed on a stage, and an image that is acquired by detecting secondary electrons, reflected electrons, or the like, are examples of images that are used in an inspection or measurement apparatus of the invention. In the present embodiment, any acquired image can be a subject of template matching. In the present embodiment, a target retrieval image 301 and a plurality of templates of different types (a template A (302), a template B (303), and a template C (304)) are input, and ultimately, a correct matching position 320 (a correct matching position of a template on the target retrieval image 301) is output. In addition, in conjunction with the matching position 320, it is also possible to output a matching score (a value that shows the probability of a solution) at the corresponding matching position. Additionally, an amount of relative positional shift between the two values at the matching position will be referred to as a shift amount of a matching result, and there are also cases in which the term "matching position" is used to represent "shift amount" (hereinafter, referred to as either "matching position" or "shift amount"). For example, in a case in which a central position of a template and a central position of a target retrieval image coincide perfectly as a result of executing a template matching process, the shift amount is 0 (zero).

Figures 7A, 7B:
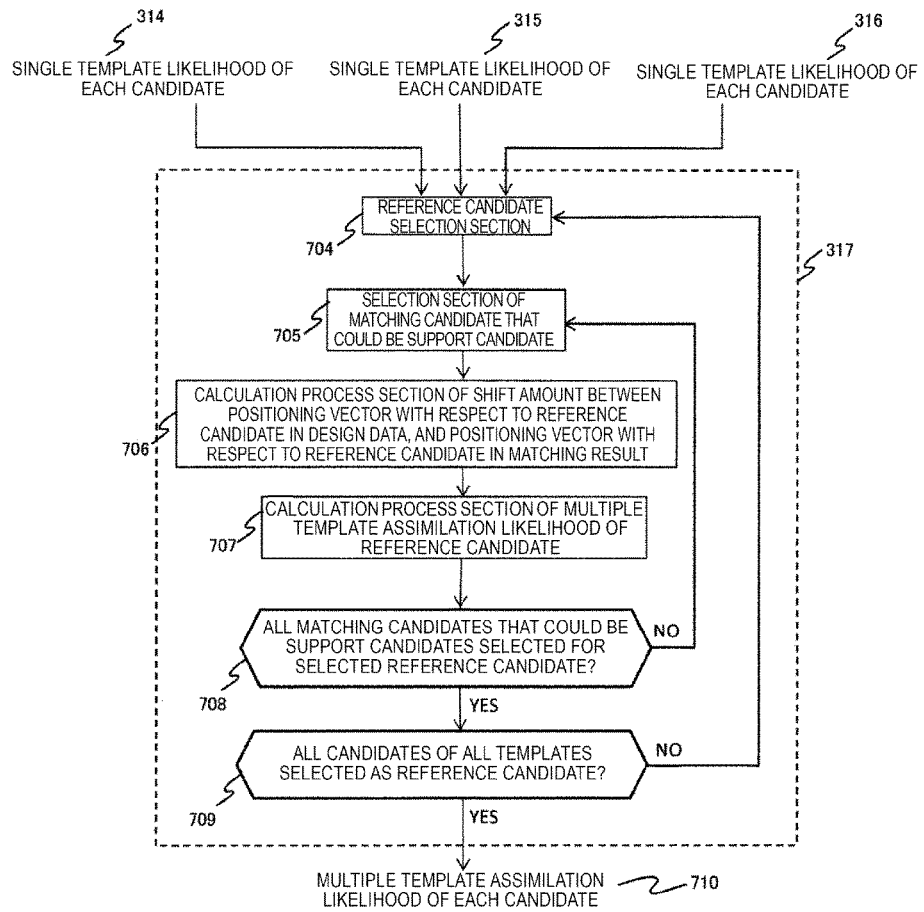
FIGS. 7A and 7B are detailed explanatory views of a calculation process of multiple template assimilation likelihood.

In the present embodiment, it is possible to perform robust template matching even in a case in which matching is unstable, which was a technical problem in the related art, by performing template matching for each template using a plurality of templates of different types even in a case in which a pattern for alignment, which corresponds to a template, is not visible in a target retrieval image of a target object, adjusting so that the background of a pattern for alignment within a target retrieval image is favorable (for example, the background can be said to be favorable in a case in which a pattern for alignment, which corresponds to retrieval subject, is visible on a target retrieval image, or in a case in which there is a very small amount of deformation of the pattern for alignment) and so as to increase the contribution to a final matching result by an extent that is equivalent to the number of matching results for which there is a high probability that a correct matching position (a solution) has been obtained (determined using means described in FIGS. 4 and 5 which will be described later), determining an assimilated evaluation index, and determining a matching position on the basis of the evaluation index (using means described in FIGS. 6 and 7, which will be described later).

Hereinafter, the details of the block diagram of FIG. 3 will be described. Firstly, in a matching candidate selection section A (305), the target retrieval image 301 and the template A (302) are set as the input, and a matching process of the target retrieval image 301 and the template A (302) is performed. For example, as a matching process that is performed in this instance, a matching candidate group A (308) is determined by performing pattern matching using a general normalized correlation technique. The matching candidate group A (308) is an upper level candidate group of a matching position for which a degree of similarity is high, which is selected by the matching candidate selection section A (305). Each candidate of the matching candidate group A (308) retains a shift amount (information of a matching position), which is a matching result in the matching candidate selection section A (305), and a matching score (for example, a normalized correlation value) at the corresponding shift amount. Additionally, it is sufficient as long as the matching process in the matching candidate selection section A (305) is a process that performs matching of a target retrieval image and a template, the matching process is not limited to a normalized correlation technique, and may be a Sum of Absolute Differences (SAD), or a matching process of feature point base. In addition, a preprocess may be performed on a target retrieval image and a template image before the matching process is executed (examples of a preprocess include a method that extracts an edge by a target retrieval image and a template image, and performs correlation arithmetic on the images, and the like). Next, in a single template likelihood calculation process section 311, the matching candidate group A (308) is set as the input, and a single template likelihood 314 is determined for each matching candidate of the matching candidate group A (308). The details of this likelihood calculation process will be mentioned later using FIGS. 4 and 5, but the single template likelihood 314 in this instance is an index that shows the degree of certainty of success or failure of a matching result of a matching candidate that is determined by the matching candidate selection section A (305), and the likelihood 314 is calculated for each matching candidate. In a similar manner, in a matching candidate selection section B (306) and a matching candidate selection section C (307), the target retrieval image 301 and the template B (303) or the target retrieval image 301 and the template C (304) are set as the inputs, and a matching candidate group B (309) and a matching candidate group C (310) are determined by performing matching processes in the matching candidate selection section B (306) and the matching candidate selection section C (307). Next, in a single template likelihood calculation process sections 312 and 313, the matching candidate group B (309) and the matching candidate group C (310)) are set as the inputs, and single template likelihoods 315 and 316 are determined for each matching candidate. In a multiple template assimilation likelihood calculation process section 317, the single template likelihoods 314, 315 and 316 of each candidate, which are calculated from the respective templates A, B and C, are set as the input, and a multiple template assimilation likelihood 318 of each candidate is determined. The details of the multiple template assimilation likelihood calculation process section 317 and the multiple template assimilation likelihood 318 of each candidate will be mentioned later using FIGS. 6 and 7, but the multiple template assimilation likelihood 318 in this instance is used as means for increasing the contribution to the assimilation likelihoods 318 by an extent that is equivalent to the number of matching results for which it is determined that there is a high probability that a correct solution has been obtained, from consistency of the single template likelihoods 314, 315 and 316, which were already determined in earlier steps, disposition information in design data of each template, and a matching position of each template. The consistency in this instance is designed so as to have a feature of the assimilation likelihood 318 being greater as the number of cases in which shift amounts between matching candidates of each template are equivalent (or close) to one another, increases. Lastly, in a highest assimilation likelihood matching candidate selection section 319, the multiple template assimilation likelihood 318 of each candidate is set as an input, and a candidate for which the assimilation likelihood 318 is highest is output as a correct solution candidate. The matching position (shift amount) of this candidate corresponds to the solution. In addition, in conjunction with this, an assimilation likelihood at this matching position (shift amount) may be output as a score. Furthermore, a selection method of the solution from the candidates in this instance is not limited to this method (a method that sets a candidate for which the assimilation likelihood 318 is highest as the correct solution). It is sufficient as long as a method in which a desired solution is chosen on the basis of assimilation likelihood, is used. For example, a method that, firstly, picks candidates for which the assimilation likelihood 318 is a set threshold value or greater, and subsequently selects a solution from the picked candidates using a predetermined method, is another example. For example, as a selection method in this instance, a matching position candidate that is close to a central coordinate of an image may be picked as a solution. In a case in which the highest assimilation likelihood attained using a process using the threshold value, is the threshold value or smaller, it is possible to determine that there is not a solution (for example, in a case in which there is not a solution, it is possible to indicate the fact that a solution was not found to a user using an alert). In addition, in a case in which there are a plurality of candidates having high likelihoods attained by using a process that picks a candidate that is close to the center of an image as a solution, it is possible to choose a matching position candidate for which it is possible to assume that there is less positional shift of the apparatus (a candidate that is close to a central coordinate of an image) as a solution.

According to the above-mentioned configuration, even in a case in which a pattern for alignment, which corresponds to a retrieval subject, is not visible in a single template and matching fails, it is possible to perform robust matching by performing a matching process using a plurality of templates of different types. Furthermore, in comparison with a method that merely chooses a matching result having a high degree of similarity in results in which a matching process is performed using each template, there is an effect of being able to raise the robustness of matching as the number of cases in which shift amounts of matching candidates are equivalent (or close) to one another when determining assimilation likelihoods from likelihoods (degrees of certainty) with each matching process result, increases, or in other words, as the number of templates in which a shift amount (a solution) is supported by a matching candidate, increases.

Additionally, in the above-mentioned embodiment, a case of the number of templates being the three templates A, B and C is shown, but the number of templates is not limited to three, and the number of templates other than three may be used. In this case, "single template likelihoods of each candidate" of an amount that is equivalent to the number of templates is determined, and these are input into the multiple template assimilation likelihood calculation process 317. Generally, the probability of matching being successful is increased by using more templates. The reason for this is that, in the input of a single template, even in a case in which a pattern for alignment (a retrieval subject pattern), an image of which is normally captured within the target retrieval image is not found and it is not possible to perform matching successfully, the probability that an image of another corresponding pattern for alignment (retrieval subject pattern) will be captured, is increased if the number of templates that are input is increased, and therefore, this leads to an increase in the probability that matching will be successful. In the same manner, the templates are not limited to three in the descriptions from this point onwards.

FIG. 4 is a detailed explanatory view of single template likelihood (314, 315 and 316), which is mentioned in the description of FIG. 3. The single template likelihood is an index value that is calculated for a matching result in a single template, and performs calculation for each matching candidate. The details of calculation means of single template likelihood will be mentioned later using FIG. 5. In addition, the single template likelihood is designed to have a characteristic of the numerical value increasing as the degree of certainty that a correct solution of a matching result is shown, increases. For example, in FIG. 4, in a case in which a target retrieval image 400 and a template 410 are set as the input, and a matching position that shows a correct solution is a correct solution position 401, since patterns 402, 403, 404 and 405, which are similar to the template 410 are present in the periphery, there is not much difference in the degree of similarity of the template 410 and the correct solution position 401, and the template 410 and the peripheral patterns 402, 403, 404 and 405. When the distribution of correlation values 413 is viewed, there is little to distinguish a correlation value 411 at the correct solution position 401, from a correlation value group 412 at the other patterns 402, 403, 404 and 405 (the correlation value 411 and the correlation value group 412 have a crowded distribution). In this case, the size of the correlation value is quickly replaced due to changes in the aspect of the pattern that corresponds to the retrieval subject within the target retrieval image. In other words, it can be said that the degree of certainty that the matching candidate position 401 is the correct solution position, is low. On the other hand, in a case in which the target retrieval image 400 and a template 420 are set as the input, and a matching position of the pattern that shows a correct solution is a correct solution position 406, since other similar patterns are not present in the periphery, when the distribution of correlation values 423 is viewed, the distributions of a correlation value 421 at the correct solution position 406 and a correlation value group 422 at the other patterns 402, 403, 404 and 405 are greatly separated. In this case, it can be said of the correlation value 421 that the degree of certainty that the matching candidate position is the correct solution position, is high. In addition, for example, in a case in which a target retrieval image 430 and the template 410 are set as the input, and pattern that shows the correct solution cannot be seen at a correct solution position 431, all matching candidates correspond to a low correlation value group 442, and in the distribution of correlation values 443, a correlation value 441 at the correct solution position 431 does not have a high value that is separated from the correlation value group 442. In this case, it can also be said that the degree of certainty of the matching candidate at the correct solution position 431, is low. In the present invention, an index value that is characterized by showing such tendencies, is used in template matching.

Figure 5A:
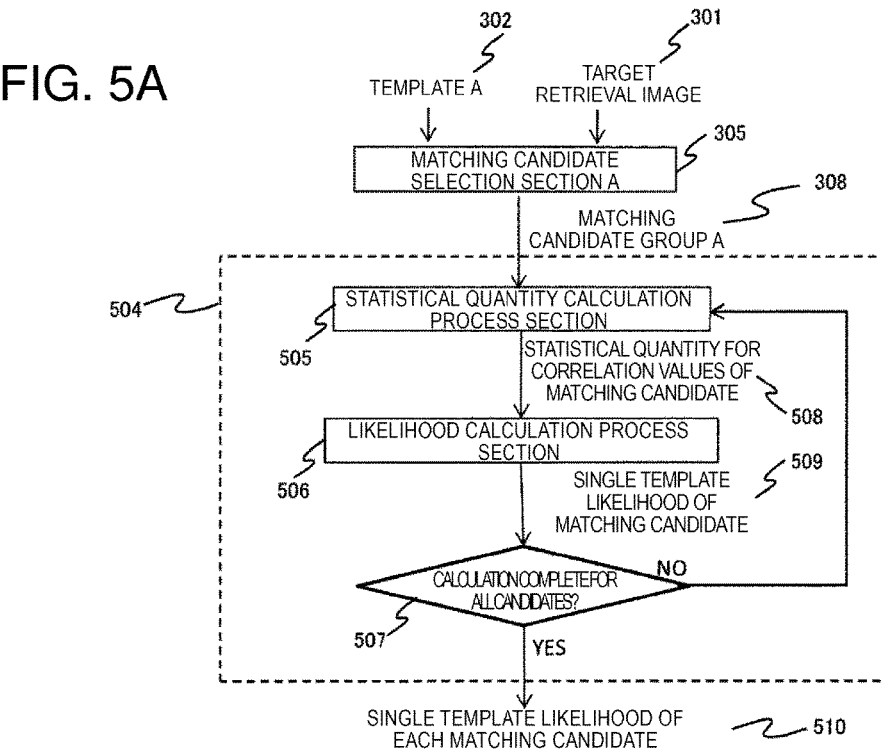
FIGS. 5A and 5B are block diagrams that show an embodiment of a calculation process of single template likelihood.

FIG. 5 is a view that describes a process that calculates single template likelihood (314, 315 and 316), which is mentioned in FIG. 3 and FIG. 4, and FIG. 5(a) is a block diagram that shows an embodiment of a single template likelihood calculation process. In the manner that is mentioned above in the description of FIG. 3, the single template likelihood calculation process is executed in a similar manner for each template, but in this instance, will be described with the template A (302) as an example. In the manner mentioned in FIG. 3, in a single template likelihood calculation process section 504, the matching candidate group A (308), which was determined by the matching candidate selection section A (305), is set as the input, and firstly, a statistical quantity 508 is calculated for a correlation value of a matching candidate in a statistical quantity calculation process section 505. The calculated statistical quantity 508 is set as information of the distribution of the correlation value that is mentioned in the description of FIG. 4. Next, a single template likelihood 509 of a matching candidate is calculated by a likelihood calculation process section 506 on the basis of the determined statistical quantity and the correlation value of each matching candidate (the calculation equation will be described in FIG. 5 (b) below). When the single template likelihood calculation process is completed for all of the matching candidates, a single template likelihood 510 of each matching candidate is determined. According to the above-mentioned configuration, it is possible to determine the likelihood based on the distribution of the correlation value of each matching candidate. The single template likelihood that is mentioned earlier can be determined to have the tendency mentioned in FIG. 4 using the Equation (1) below. $L_{uni}(x, y)_{T_{m\_n}}$ is the single template likelihood to be determined, in the subscript and superscript, m is an ID (the template A in the present example) of a template, n is an ID of a matching candidate, R is a correlation value, μ is an average value of correlation values, σ is a standard deviation of correlation values, and A and B are adjustment parameters (equivalent to A: gain, and B: bias). As mentioned above, μ and σ are determined by the statistical quantity calculation process section 505.

$$L_{uni}(x, y)_{T_{m\_n}} = \frac{1}{1 + e^{-A \cdot (R_{T_{m\_n}} - \mu_{T_m})/\sigma_{T_m} - B}} \quad (1)$$

Figure 5B:
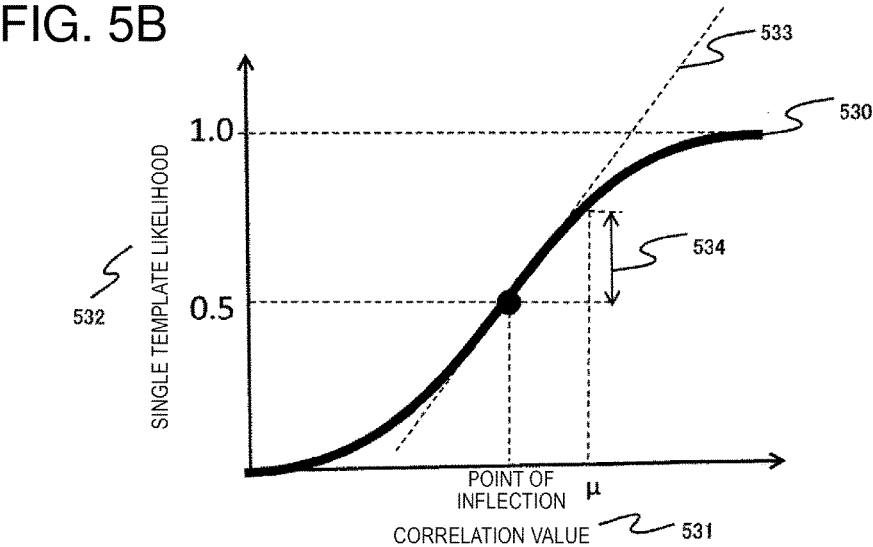
Figure 6A:
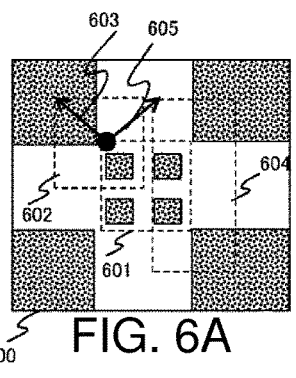
FIGS. 6A-6E are explanatory views of multiple template assimilation likelihoods.
Figure 6B:
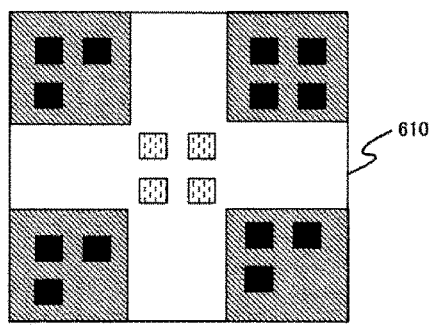
Figure 6D:
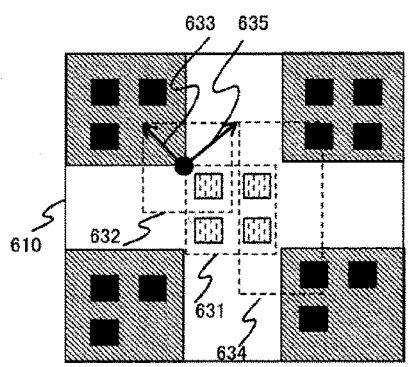
Figure 6E:
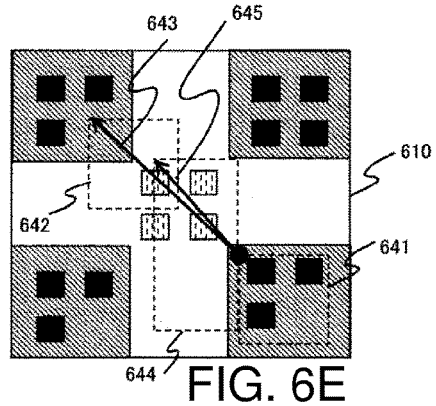
Figure 6C:
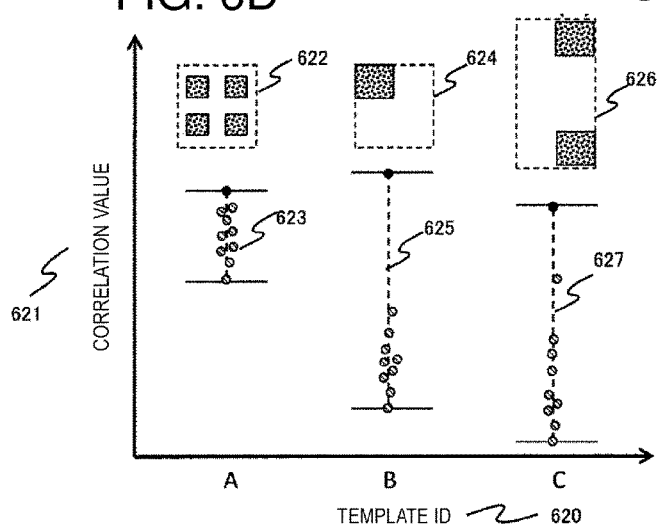

Equation (1) is an equation in which the correlation value of each matching candidate is normalized using μ h and m, or is mapped to a sigmoid function on the basis of information of the distribution of correlation values. As shown in FIG. 5(b), a correspondence relationship 530 of correlation values 531 of the horizontal axis, and single template likelihoods 532, is determined using Equation (1). As a result of this, in all of the matching candidates, the single template likelihood can be normalized to a value that is between 0.0 and 1.0. In addition, the single template likelihood corresponds to an index value that is sensitive to the vicinity of the center of the distribution of correlation values. Furthermore, it is possible to adjust the correspondence relationships of the single template likelihood with respect to the distribution of the correlation values using the adjustment parameters A and B. That is, as a result of adjusting the adjustment parameters A and B as appropriate, in a distribution of correlation values of each matching candidate, in a case in which only a single matching candidate has a high correlation value in comparison with other matching candidate groups, it is possible to design so that the single template likelihood of the corresponding single matching candidate has a high value in comparison with the single template likelihoods of other matching candidate groups. Similar processes to those of the above-mentioned template A are also performed for the other templates B and C, and the single template likelihoods 315 and 316, which are shown in FIG. 3, are determined for each matching candidate. Since both the single template likelihoods 315 and 316 are normalized on the basis of the distribution of the correlation values in each template, it is also possible to design the single template likelihood between each template as index values that can be relatively compared. Additionally, the calculation equation of the single template likelihoods is not limited to Equation (1), and it is sufficient as long as it is possible to perform calculation as an index value in which the desired tendency, which is described in FIG. 4, is obtained.

FIG. 6 is a view that describes the multiple template assimilation likelihood 318 that was mentioned earlier in the description of FIG. 3. The multiple template assimilation likelihood is an index value that assimilates the single template likelihoods, and is calculated for each matching candidate. The multiple template assimilation likelihood is designed to have a characteristic of a value of the multiple template assimilation likelihood increasing as a number of candidates (hereinafter, referred to as "support candidates" due to mutually supporting the same shift amount) among matching candidates in other templates that show a correct matching position (shift amount), increases, and as the single template likelihood of a pattern that corresponds to the retrieval subject and the single template likelihood of support candidates, increases. FIG. 6(*a*) is an example in which regions 601, 602 and 604, which are portions of design data 600 of a semiconductor pattern, are cut out as three templates, and the templates that correspond to the regions 601, 602 and 604 are respectively set as a template A, a template B and a template C. Matching processes are performed on a target retrieval image 610 of FIG. 6(*b*) with each template A, B and C set as an input. The matching processes are equivalent to the processes in the matching candidate selection section A (305), the matching candidate selection section B (306) and the matching candidate selection section C (307) in FIG. 3. Examples of matching process results are shown in FIGS. 6(*d*) and 6(*e*). In FIG. 6(*d*), a template A (601), a template B (602) and a template C (604) correspond to a matching position 631, a matching position 632, and a matching position 634 as respective correct solution positions. In FIG. 6(*d*), the shift amount (including shift direction) in each template is substantially the same. The reason for this is that, the lengths and directions of a vector 603 and a vector 633 are the same when, in a portion of the design data 600 of FIG. 6(*a*), vectors 603 and 605, which run toward upper left coordinates of the template B (602) and the template C (604) when an upper left coordinate of the template A (601) is set as a reference, and, in the target retrieval image 610 of FIG. 6(*d*), vectors 633 and 635, which run toward upper left coordinates of the matching positions 632 and 634 when an upper left coordinate of the matching position 631 is set as a reference, and can also be understood from the fact that the lengths and directions of the vector 605 and the vector 635 are the same. Hereinafter, the vectors in this instance will be referred to as "positioning vectors". In this case, when the matching position 631 is set as a reference, the matching positions 632 and 634 correspond to support candidates. Accordingly, in the case of FIG. 6(*d*), the value of the multiple template likelihood is high since there is support of support candidates. On the other hand, in the case of FIG. 6(*e*), the template A (601), the template B (602) and the template C (604) respectively correspond to the matching position 641, the matching position 642, and the matching position 644, and the shift amount (including the shift direction) of each template is different. In this case, when the matching position 641 is set as a reference, the matching positions 642 and 644 do not correspond to support candidates. Accordingly, in the case of FIG. 6(*e*), the value of the multiple template likelihood is low since there is no support of support candidates. FIG. 6(*c*) shows a distribution of correlation values of each matching candidate in each template A, B and C. When the correlation value of each candidate is used without change as the multiple template assimilation likelihood, evaluation in which an evaluation that takes into consideration the distribution of correlation values equally between the matching result of each template is not performed, and as described above, when the single template likelihood is used, since normalization is performed between the matching results of each template, it is possible to perform evaluation in which an evaluation that takes into consideration the distribution of correlation values equally. As a result of this, it is possible to determine the multiple template assimilation likelihood by combining a reference candidate and a single template likelihood in a support candidate. A detailed determination method will be described in FIG. 7.

FIG. 7 is a view that describes the details of a process that calculates the multiple template assimilation likelihood which is mentioned in FIG. 3 and FIG. 6. FIG. 7(*a*) is a block diagram that shows an embodiment of a multiple template assimilation likelihood calculation process. In the manner described in FIG. 3, in the multiple template assimilation likelihood calculation process section 317, the single template likelihoods 314, 315 and 316 of each matching candidate of each template are set as the input, and firstly, in the reference candidate selection section 704, a candidate, which corresponds to a reference, is selected from each matching candidate of each template.

Next, in a selection section of a matching candidate that could be a support candidate 705, a matching candidate that could be a support candidate is selected for the reference candidate that was picked earlier. In this instance, a matching candidate of a retrieval process result in each template other than the template of the reference candidate is selected as a support candidate.

Next, in a calculation process section of a shift amount between a positioning vector with respect to a reference candidate in design data, and a positioning vector with respect to the reference candidate in a matching result 706, positioning vectors of the reference candidate, and the matching candidate that could be a support candidate are determined from the matching positions (the shift amounts) in the target retrieval image. The positioning vectors of the reference candidate, and the matching candidate that could be a support candidate are collectively determined from the cut out positions of the templates that are respectively cut out from the design data. The shift amounts (vectors) are calculated from these two positioning vectors (hereinafter, referred to as "shift amount vectors"). A matching candidate for which the shift amount vector is small corresponds to a support candidate. In a calculation section of the multiple template assimilation likelihood of the reference candidate 707 in the reference candidate, the calculated shift amount vectors and the single template likelihood of each matching candidate are set as the input, and the multiple template assimilation likelihood is calculated (the calculation equation will be described in FIG. 7(*b*) below). The processes from the selection section of a matching candidate that could be a support candidate 705 up to the calculation process section of the multiple template assimilation likelihood of the reference candidate 707, are repeated until the selection of all of the matching candidates that could be a support candidate is completed for the selected reference candidate (708). Furthermore, the process from the reference candidate selection section 704 up to 708, are repeated until the selection of all of the candidates of all of the templates are finished as the reference candidates (709). When the calculation of the multiple template assimilation likelihoods of all of the matching candidates, is finished, the processes in the multiple template assimilation likelihood calculation process section 317 are completed.

According to the above-mentioned configuration, it is possible to determine the multiple template assimilation likelihood taking into consideration the dispositions of the templates in the plurality of templates, and the dispositions of the matching positions that are obtained in the matching processes of each template. The likelihood that is calculated by the multiple template assimilation likelihood calculation process section for the above-mentioned reference candidate can be designed to have the characteristic that is mentioned in FIG. 6, and for example, to be determined by Equations (2) and (3) below. In Equation (2), $L_{multi}(x, y)_{Tm\_n \Leftrightarrow Tm'\_c}$ is the multiple template assimilation likelihood, in the subscript and superscript, n is an ID of a matching candidate that could be a support candidate, m is a template ID of the candidate, c is an ID of a reference candidate, and m' is a template ID of the reference candidate. The $L_{multi}(x, y)_{Tm\_n \Leftrightarrow Tm'\_c}$ is calculated by respectively applying a weighting to and multiplying the single template likelihoods of the reference candidate and the support candidate. The weighting in this instance is set as $D(x, y)_{Tm\_n \Leftrightarrow Tm'\_c}$, and is represented in the manner of Equation (3). The weighting is designed to have a characteristic of increasing as a difference in the shift amounts (a difference in the sizes and the directions) of the reference candidate and the matching candidate that could be a support candidate, decreases. C and D are adjustment parameters. The weighting is designed to have characteristics of having a value from 0.0 to 1.0, having the highest value 1.0 when the shift amounts are equivalent, the value of weighting decreasing by an extent that is equivalent to a difference in the sizes of the shift amounts, and being 0.0 when larger than the adjustment parameter C. The tendency of the weighting that is represented by Equation (3) is shown in FIG. 7(*b*). The tendency of the weighting, which depends on the sizes of the shift amounts, can be adjusted using D. According to the above-mentioned configuration, the multiple template assimilation likelihood is determined taking into consideration the extent of the coincidence between the dispositions of the templates in the plurality of templates, and the dispositions of the matching positions that are obtained in the matching processes of each template, and taking into consideration the single template likelihoods of each template. Additionally, as long as a calculation method of a likelihood that has the tendency of the characteristics that are described in FIG. 6, is used, the calculation method is not limited to Equations (2) and (3).

$$L_{multi}(x, y)_{Tm\_n} = 1 - \prod_{m'=1} \left(1 - D(x, y)_{Tm\_n \Leftrightarrow Tm'\_c} \cdot L_{uni}(x, y)_{Tm'\_c}\right) \quad (2)$$

$$D(x, y)_{Tm\_n \Leftrightarrow Tm'\_c} = \max\left(1 - \left(\frac{\left\|(x, y)_{Tm\_n} - (x, y)_{Tm'\_c}\right\|_2}{C}\right)^D, 0\right) \quad (3)$$

Embodiment 2

FIG. 8 is a second embodiment of a template matching process of the invention that correlates an acquired image of a target object, which is captured by an inspection or a measurement apparatus, and a template, which is cut out from an image created using design data as a pattern for alignment, and is a block diagram illustrating a flow of an arithmetic processing device. The main differences from the first embodiment that is described in FIG. 3, are a feature of being able to input a plurality of respectively different types of target retrieval images A, B and C to matching candidate selection sections D, E and F, and a feature of being able to perform retrieval processes using respectively different types of matching methods in the matching candidate selection sections D, E and F. Additionally, it is possible for the embodiment to be simultaneously provided with these different functions, but it is also possible for the embodiment to be provided with either one of the functions only. Other configurations are similar to those of the description in FIG. 3.

For example, the input of the plurality of types of target retrieval images A, B and C uses images that are acquired with different types of optical conditions for the same observation target object, or alternatively, with different types of sensor (detectors). For example, in an optical camera, it is possible to use Bright Field microscopy (BF) and Dark Field microscopy (DF), or images having different frequency bands such as visible light images and infrared light images, as target retrieval images. In addition, examples of images that are acquired by an electron microscope that may be used as target retrieval images include secondary electron images, reflected electron images, inclined radiation (inclined detection) images of electrons, images with other different conditions (acceleration voltages, focusing values, and the like, of an electron gun), and the like. The visibility of a target object differs depending on optical conditions and a detector, and there are subjects that have strengths and weaknesses in terms of obtaining visibility depending on these. There are cases in which it is possible to include an image with high visibility as a target retrieval image by using a plurality of target retrieval image having different visibilities. As described up until this point, by using the invention, even in a case in which a target object, which corresponds to a certain template, is not visible within a target retrieval image, as long as the target object is visible in another template, it is possible to obtain an effect of being possible to perform matching successfully, but if the configuration of the present second embodiment is used, even in a case of the same template (naturally, the same also applies to a case of different templates), as long as the target object is visible in a single target retrieval image among a plurality of target retrieval images, it is possible to perform matching successfully. Additionally, in this case, it is necessary to perform alignment (calibration) of the coordinate systems between the plurality of types of target retrieval image. However, in a case in which a condition such as an optical filtering process differs, but images that are acquired using the same sensor are used as target retrieval images, since the positional shift does not occur in theory, alignment (calibration) is not necessary (for example, an optical camera using a Bayer CFA, or the like).

For example, in addition to the general correlation arithmetic that is described in FIG. 3, the plurality of types of matching candidate selection section may use a retrieval method of a characteristic feature base, or various other matching methods that have been suggested in the image processing field. As a result of this, as long as it is possible to include a case in which a correct solution position is obtained by any one of the matching methods, it is possible to perform matching successfully using the means of the invention that have been described up until this point.

The block diagram of the present embodiment, which is shown in FIG. 8, will be described below. In the manner mentioned earlier, a plurality of different types of a target retrieval image A (800), a target retrieval image B (801) and a target retrieval image C (802) are set as the input. In this instance, an example in which three target retrieval images are input is shown, but the invention is not limited to three images, and more than three target retrieval images and less than three target retrieval images may also be used. The respective target retrieval images are set as inputs, and a matching candidate group D (805), a matching candidate group E (815), and a matching candidate group F (825) are determined by performing retrieval processes in a matching candidate selection section D (804), a matching candidate selection section E (805), and a matching candidate selection section F (806). In this instance, the matching candidate selection section D (804), the matching candidate selection section E (805), and the matching candidate selection section F (806) may use respectively different matching methods. Alternatively, even if the matching methods are the same, the setting parameters only of the matching methods may be different (for example, it is sufficient if only parameters such as a Gaussian filter size that is used in a preprocess, a reduction rate during a coarse-to-fine search, are different). After the matching candidate groups D, E and F are determined, in the same manner as the description of FIG. 3, the matching position (the shift amount) 820 is ultimately determined by performing the processes in the likelihood calculation process sections 311, 312 and 313, the multiple template assimilation likelihood calculation process section 317 and the highest assimilation likelihood matching candidate selection section 319.

According to the above-mentioned configuration, as a result of using the second embodiment of the invention, it is possible to perform matching successfully even if in a case in which a template (a pattern for alignment) is indistinct in a single target retrieval image, and, as a result of including an image (an image in which the pattern for alignment is clearly visible) that is captured using other conditions in which the optical conditions or the sensor is different, even in a case in which matching is not stable (a case in which the degree of certainty of matching is low) in the input of a single target retrieval image, and therefore, it is possible to realize robust matching.

FIG. 9 is a view that shows a pattern gauging system of another embodiment of the invention, and an arithmetic processing device 904 (a pattern matching apparatus) is provided with a recipe creation section 911, which sets conditions of a template, a matching process section 921, which executes a pattern matching process on the basis of a set template, and a pattern gauging section 931, which executes a gauging process of a gauging position that is specified by the matching process section 921. In addition to the arithmetic processing device 904, an SEM body 901, a control device 902 of the SEM body 901, a design data storage medium 905, which stores design data, and an input-output device 906, which inputs and outputs required information to the arithmetic processing device 904, are provided in the system that is illustrated by way of example in FIG. 9. Secondary electrons, and the like, which are obtained as a result of scanning of an electron beam, are detected by a detector 903, and are sent to the arithmetic processing device 904 as a target retrieval image of the matching process section 921, and as a signal for gauging from the pattern gauging section 931. Additionally, in the present embodiment, a configuration in which the control device 902 and the arithmetic processing device 904 are separate is described, but an integral control and arithmetic processing device may also be used. The signal based on the electrons that are detected by the detector 903, is converted into a digital signal by an A/D converter (not illustrated in the drawings), which is built into the control device 902, and an image process is performed depending on the object, by image processing hardware such as a CPU, an ASIC, or an FPGA (not illustrated in the drawings) that is built into the arithmetic processing device 904. In the manner mentioned above, the recipe creation section 911, the matching process section 921 and the pattern gauging section 931 are built into an arithmetic processing section 907 of the arithmetic processing device 904. A process that cuts out a portion of design data, which is read from the design data storage medium 905, is performed in a cut-out section 912 on the basis of pattern identification data such as coordinate information, which is set from the input-output device 906. In addition, the recipe creation section 911 creates pattern data, which serves as a template in matching, on the basis of the cut-out design data (layout data). The process content in the matching process section 921 is the same as that described using FIG. 3. Design data, recipe information, image information, gauging results, and the like, are stored in a memory 908. Additionally, it is possible to perform processing and control by allocating either a portion of or all of the control and processes in the arithmetic processing device 904 to the CPU, an electron calculation machine, in which memory that is capable of storing images is installed, or the like. In addition, the input-output device 906 functions as an image capturing recipe creation device, which sets gauging conditions, which include the coordinates, a type of pattern, and image capturing conditions (optical conditions and movement conditions of a stage) of an electronic device that is required in gauging or inspection, as an image capturing recipe. In addition, the input-output device 906 has functions of collating input coordinate information and information relating to a type of pattern with layer information of design data and identification information of a pattern, and of reading required information from the design data storage medium 905. The design data that is stored in the design data storage medium 905 is represented using the GDS format, the OASIS format, or the like, and is stored in a predetermined form. In addition, the type of the design data is not important as long as it is possible for software, which displays the design data, to display the format thereof, and as long as the design data can be handled as graphic data. In addition, the graphic data may be line segment image information, on which a deformation process that is close to a practical pattern has been carried out by carrying out an exposure simulation in semiconductor pattern creation instead of line segment image information that shows an ideal shape of a pattern that is formed on the basis of design data.

FIG. 10 is an explanatory view of a Graphical User Interface (GUI) for registering a plurality of templates, and a GUI for displaying matching results, in the invention. Additionally, it is not necessary for a GUI to arrange all of the parts that are described in this instance, it is possible to only a portion thereof to be arranged, and the disposition of each part may differ. In addition, as long as each part of a GUI has an equal function, the shapes, and the like, need not precisely coincide. Firstly, imaged design data 1007 is displayed in a template registration section 1001. In a design data image 1007, regions of templates, which a user sets, are displayed in an overlaying manner (for example, the three types of template 1003, 1004, and 1005 are displayed). As a result of displaying in an overlaying manner, it is possible for a user to confirm the phases of the set templates and the positional relationships of the templates at a glance.

Only the outline is displayed in the regions of the templates, and therefore, it is possible to set a configuration in which it is possible to confirm the templates in conjunction with the phases of the design data. It is possible to set a template region by directly drawing a region on the design data image 1007 using a mouse, or the like. In addition, the template registration section 1001 also includes an interface 1002 for setting the position (image coordinates) and size (information of the width and the height) of a template by means of the input of numerical values. For example, it is possible to set the position (for example, an upper left coordinate of a template A) and size (information of the width and the height) of the template of the template A. In addition, in the embodiment that is described in FIG. 8, an example in which setting is performed by varying a matching method, optical conditions (an image capturing magnification, or the like), a sensor (detector), and the like for each template, and such settings are also possible in this GUI.

Next, a shift amount 1051, which is a matching result, is displayed in a matching results display section 1050, and the matching results of each template is displayed in an overlapping manner on a target retrieval image 1060. Matching positions 1061, 1062 and 1063 of the three types of template are displayed in the embodiment of FIG. 10. In addition, the reference candidate and support candidates may also be displayed in conjunction with the above. As a result of this kind of visual GUI, it is possible for a user to easily confirm matching results. In addition, information of the single template likelihood of each candidate that is used in the multiple template assimilation likelihood, and the matching position can be displayed (1070). It is possible for a user to confirm the extent of the usefulness of a set template by referring to the likelihood (it is possible for a user to determine that a template is useful as the likelihood increases). In addition, distribution information of correlation values, which correspond to source data from which the single template likelihood is calculated, can be displayed on the GUI (1080). In addition, the results subsequent to a second matching candidate can also be displayed on the GUI (1090). In the invention, a GUI that is characterized by displaying either all of or a portion of the factors exemplified in this instance, can be provided. According to the above-mentioned configuration, it is possible for a user to register a plurality of templates in the invention, to perform detailed confirmation of a matching result on an interface that is easy to understand in both a visual and an intuitive manner.

REFERENCE SIGNS LIST

100 HOUSING
101 ELECTRON GUN
102 STAGE
103 SEMICONDUCTOR WAFER
104 DEFLECTOR
105 OBJECT LENS
106 SECONDARY ELECTRON DETECTOR
107, 109, 110 AND 112 A/D CONVERTER
108 REFLECTED ELECTRON DETECTOR
111 OPTICAL CAMERA
114 ARITHMETIC PROCESSING DEVICE
115 MEMORY
116 ARITHMETIC PROCESSING SECTION
141 ELECTRON BEAM
142 CONDENSING LENS
201 TEMPLATE
210, 220 AND 230 TARGET RETRIEVAL IMAGE
305 MATCHING PROCESS SELECTION SECTION A
306 MATCHING PROCESS SELECTION SECTION B
307 MATCHING PROCESS SELECTION SECTION C
311, 312 AND 313 SINGLE TEMPLATE LIKELIHOOD CALCULATION PROCESS SECTIONS
317 MULTIPLE TEMPLATE ASSIMILATION LIKELIHOOD CALCULATION PROCESS SECTION
319 HIGHEST ASSIMILATION LIKELIHOOD MATCHING CANDIDATE PROCESS SELECTION SECTION
400 AND 430 TARGET RETRIEVAL IMAGES
504 SINGLE TEMPLATE LIKELIHOOD CALCULATION PROCESS SECTION
505 STATISTICAL QUANTITY CALCULATION PROCESS SECTION
506 LIKELIHOOD CALCULATION PROCESS SECTION
600 DESIGN DATA OF SEMICONDUCTOR PATTERN
610 TARGET RETRIEVAL IMAGE
704 REFERENCE CANDIDATE SELECTION SECTION
705 SELECTION SECTION OF MATCHING CANDIDATE THAT COULD BE PORT CANDIDATE
706 CALCULATION PROCESS SECTION OF SHIFT AMOUNT BETWEEN POSITIONING VECTOR WITH RESPECT TO REFERENCE CANDIDATE IN DESIGN DATA, AND POSITIONING VECTOR WITH RESPECT TO REFERENCE CANDIDATE IN MATCHING RESULT
707 CALCULATION SECTION OF MULTIPLE TEMPLATE ASSIMILATION LIKELIHOOD OF REFERENCE CANDIDATE
804 MATCHING PROCESS SELECTION SECTION D
814 MATCHING PROCESS SELECTION SECTION E
824 MATCHING PROCESS SELECTION SECTION F
901 SEM BODY
902 CONTROL DEVICE
903 DETECTOR
904 ARITHMETIC PROCESSING DEVICE
905 DESIGN DATA STORAGE MEDIUM
907 ARITHMETIC PROCESSING SECTION
908 MEMORY
911 RECIPE CREATION SECTION
921 MATCHING PROCESS SECTION
931 PATTERN GAUGING SECTION
1001 TEMPLATE REGISTRATION SECTION
1050 MATCHING RESULTS DISPLAY SECTION

The invention claimed is:

1. An inspection apparatus that acquires a target retrieval image, and carries out template matching on the target retrieval image, the inspection apparatus comprising:
an image acquisition device that illuminates a wafer with an electron beam and captures the target retrieval image based on secondary electrons emitted from the wafer;
a user interface through which a user inputs a plurality of templates; and
an arithmetic processor programmed to
select a matching candidate group by performing a matching process of the target retrieval image and the plurality of templates;
calculate single template likelihoods for a plurality of selected matching candidate groups;
calculate a multiple template assimilation likelihood for the matching candidate groups using a plurality of the calculated single template likelihoods;
select a matching candidate for which the multiple template assimilation likelihood is either the highest or is a threshold value or greater, from among the matching candidate groups, using the calculated multiple template assimilation likelihoods; and align a coordinate system of the wafer based on the selected matching candidate.

2. The inspection apparatus according to claim 1, wherein the arithmetic processor outputs either a matching position or a highest assimilation likelihood.

3. The inspection apparatus according to claim 1, wherein there are a plurality of target retrieval images.

4. The inspection apparatus according to claim 1, wherein the single template likelihoods are calculated using a statistical quantity of a correlation value of a matching candidate within a matching candidate group.

5. An inspection method that acquires a target retrieval image in an inspection apparatus, and carries out template matching on the target retrieval image, the inspection method comprising:

illuminating a wafer with an electron beam and capturing the target retrieval image based on secondary electrons emitted from the wafer;

receiving a plurality of templates input by a user through a user interface;

selecting a matching candidate group by performing a matching process of the target retrieval image and the plurality of templates;

calculating single template likelihoods for a plurality of matching candidate groups that are selected;

calculating a multiple template assimilation likelihood for the matching candidate groups using a plurality of the calculated single template likelihoods; and selecting a matching candidate for which the multiple template assimilation likelihood is either the highest or is a threshold value or greater, from among the matching candidate groups, using the calculated multiple template assimilation likelihoods; and aligning a coordinate system of the wafer based on the selected matching candidate.

6. The inspection method according to claim 5, further comprising:

outputting either a matching position or a highest assimilation likelihood.

7. The inspection method according to claim 5, further comprising:

acquiring, by the image inspection apparatus, a plurality of the target retrieval images.

8. The inspection method according to claim 5, further comprising:

calculating the single template likelihoods using a statistical quantity of a correlation value of a matching candidate within a matching candidate group.

* * * * *